(12) United States Patent
Komagamine

(10) Patent No.: US 7,676,115 B2
(45) Date of Patent: Mar. 9, 2010

(54) IMAGE PROCESSING METHOD, IMAGE PROCESSOR AND IMAGE PROCESSING PROGRAM PRODUCT

(75) Inventor: Katsumi Komagamine, Kagoshima-ken (JP)

(73) Assignee: Seiko Epson Corporation, Tokyo (JP)

( * ) Notice: Subject to any disclaimer, the term of this patent is extended or adjusted under 35 U.S.C. 154(b) by 1372 days.

(21) Appl. No.: 11/034,496

(22) Filed: Jan. 12, 2005

(65) Prior Publication Data
US 2005/0180650 A1    Aug. 18, 2005

(30) Foreign Application Priority Data
Jan. 14, 2004    (JP) ............................. 2004-006945

(51) Int. Cl.
G06K 9/32    (2006.01)
G06K 9/36    (2006.01)

(52) U.S. Cl. ..................................... 382/293
(58) Field of Classification Search ......... 382/276–300, 382/274–275; 345/648–659
See application file for complete search history.

(56) References Cited

U.S. PATENT DOCUMENTS 5,436,734 A    7/1995    Yamauchi et al.
6,757,445 B1 *  6/2004    Knopp ........................ 382/285

FOREIGN PATENT DOCUMENTS

| JP | 64-12378 | 1/1989 |
| JP | 05-207266 | 8/1993 |
| JP | 09-231349 | 9/1997 |
| JP | 2000-081872 | 3/2000 |
| JP | 2002-190979 | 7/2002 |

OTHER PUBLICATIONS

Abstract of Japanese Patent Publication No. 09-0231349, Pub. Date: Sep. 5, 1997, Patent Abstracts of Japan.
M. Takagi and H. Shimoda (eds.), "Handbook of Image Analysis," University of Tokyo Press (1991), pp. 423-444, with partial English translation.
Abstract of Japanese Patent Publication No. 2000-081872, Pub. Date: Mar. 21, 2000, Patent Abstracts of Japan.
Abstract of Japanese Patent Publication No. 2002-190979, Pub. Date: Jul. 5, 2002, Patent Abstracts of Japan.
Abstract of Japanese Patent Publication No. 05-207266, Pub. Date: Aug. 13, 1993, Patent Abstracts of Japan.

* cited by examiner

Primary Examiner—Sherali Ishrat
(74) Attorney, Agent, or Firm—Martine Penilla & Gencarella, LLP

(57) ABSTRACT

An image processing method includes a step of obtaining an input image, and a transformation step of performing multiple image transformations including multiple geometric transformations. The transformation step includes calculating correspondences between image coordinates of the input image and image coordinates of the output image based on multiple coordinate transformation equations corresponding to geometric transformations, then defining pixel values of the corresponding output image based on pixel values of the input image, and interpolating space pixels of the output image that do not have corresponding pixels in the input image once for each space pixel.

10 Claims, 16 Drawing Sheets

IMAGE PROCESSING METHOD, IMAGE PROCESSOR AND IMAGE PROCESSING PROGRAM PRODUCT

CROSS REFERENCE TO RELATED APPLICATIONS

The disclosure of Japanese Patent Application No. 2004-006945 filed on Jan. 14, 2004, including the specification, drawings and abstract, is incorporated herein by reference in its entirety.

BACKGROUND OF THE INVENTION

1. Field of the Invention

The present invention relates to an image processing method, an image processor, and an image processing program product, and, in particular, it relates to an image processing method, an image processor, and an image processing program product for performing multiple image transformations.

2. Description of the Related Art

An image processor has been known whereby a user can obtain an image desired by the user by performing correction of a lens distortion, perspective transformation for correcting a perspective of a building, for example, and/or correction of thickness of a subject on a portrait photograph, for example, on a digital image shot by a digital camera, for example. In this kind of image transformation based on a geometric transformation, pixels of an input image do not always correspond to pixels of the geometrically transformed and output image thereof in a one-to-one relationship, and pixel values of the pixels of the output image are interpolated from pixel values of the corresponding input image by a Bilinear Interpolation Method and/or a Cubic Convolution Method, for example, which may deteriorate the image to no small extent. When, these geometric transformations are performed in combination in a conventional image processor, interpolation processing is performed for every image transformation since the image transformations are performed separately and independently, which may cause deterioration of the output image.

SUMMARY OF THE INVENTION

The present invention was made in order to solve these problems, and it is an object of the invention to provide an image processing method, an image processor, and an image processing program product for suppressing deterioration of an image due to image transformations including multiple geometric transformations.

(1) For solving the above problems, an image processing method includes: a step of obtaining an input image; and a transformation step of performing multiple image transformations including multiple geometric transformations, the transformation step including calculating correspondences between image coordinates of the input image and image coordinates of the output image based on multiple coordinate transformation equations corresponding to geometric transformations, then defining pixel values of the corresponding output image based on pixel values of the input image, and interpolating the space pixels of the output image that do not have corresponding pixels in the input image once for each space pixel.

According to an embodiment of the image processing method, deterioration of an output image due to interpolation can be minimized since interpolating processing is performed once for multiple image transformations including multiple geometric transformations.

(2) The image processing method may further include a command receiving step of receiving multiple transformation commands in an arbitrary order. In the transformation step, multiple image transformations may be performed in a predetermined order, which is different from the order of the multiple transformation commands received in the command receiving step.

According to an embodiment of the image processing method, image transformations can be performed in an optimum order that minimizes deterioration of image quality since the image transformations are performed in a predetermined transformation order independently of the order of receiving transformation commands from a user.

(3) In the transformation step, pixel values of pixels corresponding to a peripheral part of a lens used for forming an image of a subject of the input image may be corrected before geometric transformations.

According to an embodiment of the image processing method, even when a user instructs that pixels corresponding to a peripheral part of a lens be corrected after the user commands a geometric transformation, a drop in an amount of light in the peripheral part of the lens can be corrected properly by correcting the pixels corresponding to the peripheral part of the lens before the geometric transformation independently of the order of receiving transformation commands from the user.

(4) In the transformation step, a correction of a distortion due to a distortion aberration of a lens used for forming an image of a subject of the input image, a perspective transformation and a linear geometric transformation may be performed in order.

(5) The image processing method may further include a first storing step of storing transformation parameters, which are used in the multiple image transformations performed in the transformation step, in association with the output image, and an inverse transformation step of inversely transforming the output image based on the transformation parameters stored in the first storing step.

According to an embodiment of the image processing method, image data of an input image can be reproduced from image data and a transformation parameter of the output image even when the image data of the input image is not stored. Thus, for example, when a desired output image cannot be obtained after transformation, a desired output image can be obtained by performing the transformation again by redefining a transformation parameter for the input image resulting from inverse transformation. According to an embodiment of the image processing method, a storage area can be effectively used since an input image does not have to be stored for re-transformation.

(6) In the first storing step, the order of the multiple image transformations performed in the transformation step may be stored in association with the output image. In the inverse transformation step, multiple inverse transformations corresponding to multiple image transformations performed in the transformation step may be performed based on the transformation order stored in the first storing step.

According to an embodiment of the image processing method, the reproducibility of an input image can be enhanced by performing an inverse transformation on the output image in a reverse order of the image transformations, for example, based on the order of the image transformations.

(7) The image processing method may further include a selecting step of receiving a select command for selecting one of multiple predetermined combinations of multiple image transformations. In the transformation step, a combination of multiple transformations in accordance with the received select command may be performed.

According to an embodiment of the image processing method, a desired output image can be obtained without requiring a user to select transformation commands one by one since a predetermined combination of multiple image transformations is stored in advance so that the combination can be selected by the user. That is, according to the invention, the operability can be enhanced.

(8) The image processing method may further include a defining step of storing a combination of multiple image transformations in a storage medium. In the selecting step, the select command for selecting one of the combinations stored in the storage medium may be received.

According to an embodiment of the image processing method, since a combination of multiple image transformations defined by a user can be stored, the user can define the combination of image transformations easily. That is, according to the invention, the operability can be enhanced.

(9) For solving the above problems, an image processor includes: a unit for obtaining an input image; and a transformation unit for performing multiple image transformations including multiple geometric transformations, the transformation unit calculating correspondences between image coordinates of the input image and image coordinates of the output image based on multiple coordinate transformation equations corresponding to geometric transformations, then defining pixel values of the corresponding output image based on pixel values of the input image, and interpolating space pixels of the output image that do not have corresponding pixels in the input image once for each space pixel.

According to an embodiment of the image processor, deterioration of an output image due to interpolation can be minimized since interpolating processing is performed once for multiple image transformations including multiple geometric transformations.

(10) For solving the above problems, an image processing program product may include instructions defining program product units for allowing a computer to perform various functions, including: program instructions for obtaining an input image, and program instructions for performing multiple image transformations including multiple geometric transformations, the program instructions for performing multiple image transformations calculating correspondences between image coordinates of the input image and image coordinates of the output image based on multiple coordinate transformation equations corresponding to geometric transformations, then defining pixel values of the corresponding output image based on pixel values of the input image, and interpolating space pixels of the output image that do not have corresponding pixels in the input image once for each space pixel.

According to an embodiment of the image processing program product, deterioration of an output image due to interpolation can be minimized since interpolating processing is performed once for multiple image transformations including multiple geometric transformations.

In addition, each function of a plurality of the units provided for according to the foregoing embodiments of the invention may be implemented by hardware resources such that the functions are specified by the hardware configuration itself, or hardware resources such that the functions are specified by software programs, or combinations thereof. Furthermore, each function of the plurality of the various functions of the different units described is not limited to those being implemented by hardware resources physically independent of one another.

The invention is taught below by way of various specific exemplary embodiments explained in detail, and illustrated in the enclosed drawing figures.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention. In the drawings.

DESCRIPTION OF THE PREFERRED EMBODIMENTS

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention.

An embodiment of the invention will be described based on examples.

Figure 2:
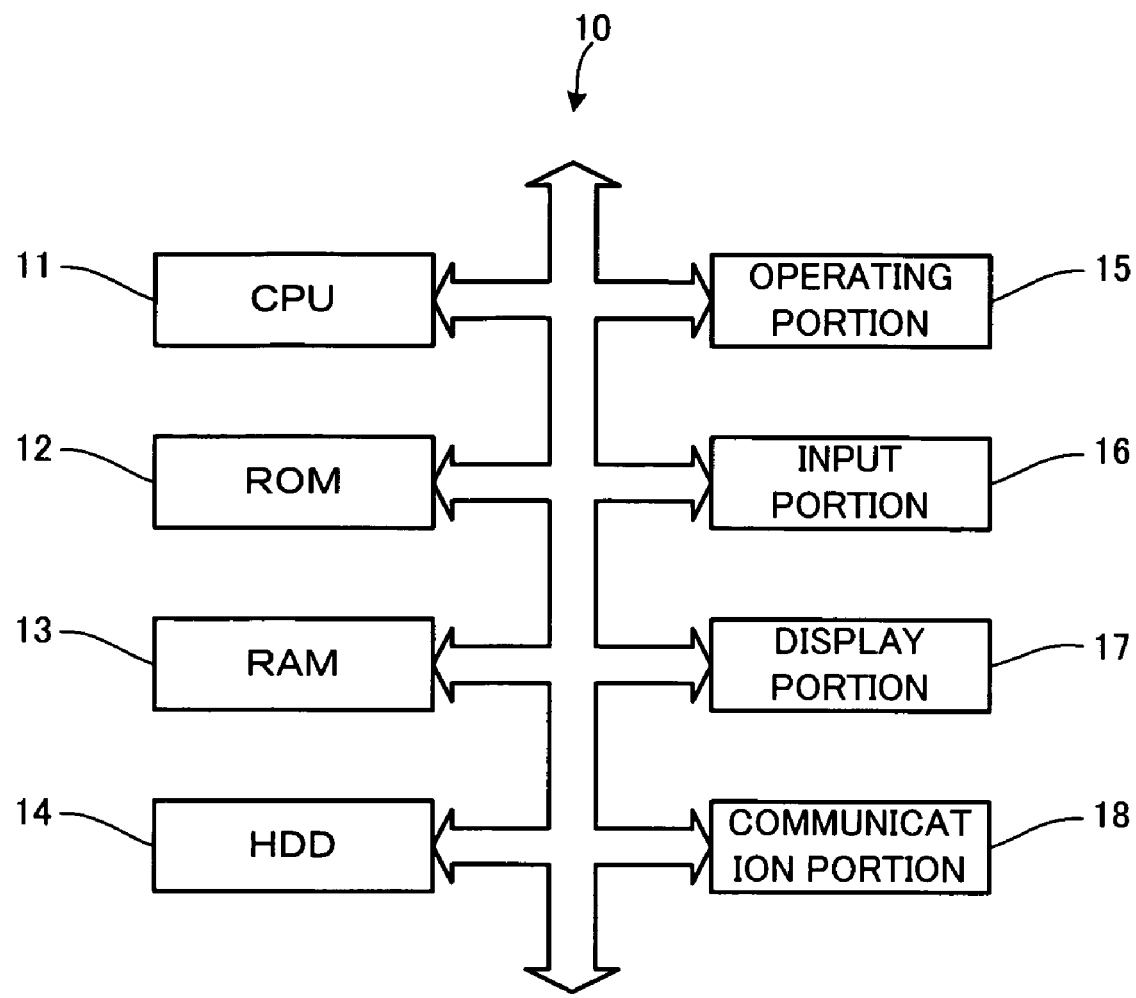
FIG. 2 is a block diagram according to an example of the invention.

FIG. 2 is a block diagram showing an image processor 10 according to an example of the invention. The image processor 10 is a personal computer in which a photo retouch application and/or developing application programs, for example, are installed as image processing programs. The developing application program is a computer program for transforming RAW data corresponding to output values of pixels of a color area sensor of a digital camera to color image data having RGB tone values for one pixel.

A CPU 11 controls the entire image processor 10 by executing a program stored in a ROM 12 or a hard disk drive (HDD) 14. The RAM 13 is a memory that temporarily stores a program to be executed by the CPU 11 and/or data such as a digital image file input through an input potion 16. The HDD 14 stores various kinds of data such as a program to be executed by the CPU 11 and a digital image file input through the input portion 16 or a communication portion 18. An operating portion 15 includes a keyboard and a mouse, not shown, and receives operations by a user such as selecting an image file representing an input image to be transformed and defining a transformation type and a transformation parameter. The input portion 16 is used to input data of a digital image file, for example, stored in a removable memory, not shown. The communication portion 18 includes a modem and a network interface card, not shown. The communication portion 18 is used for connecting to a predetermined server via a wired or wireless communication network such as a telephone line and a LAN and for receiving data of a digital image file, for example, stored in the server. The display portion 17 includes a display such as an LCD and a display controller, for example.

An image processing program to be executed by the CPU 11 performs a correction of a distortion due to a distortion aberration of a lens, perspective transformation, geometric transformation and/or density transformation on a digital image created through a digital camera or a scanner, for example. In this case, the perspective transformation is performed for correcting a perspective of a building, for example. The geometric transformation is performed for correcting a subject of a portrait photo to be thin (portrait thickness correction). The density transformation is performed for correcting a drop in an amount of ambient light.

Figure 3:
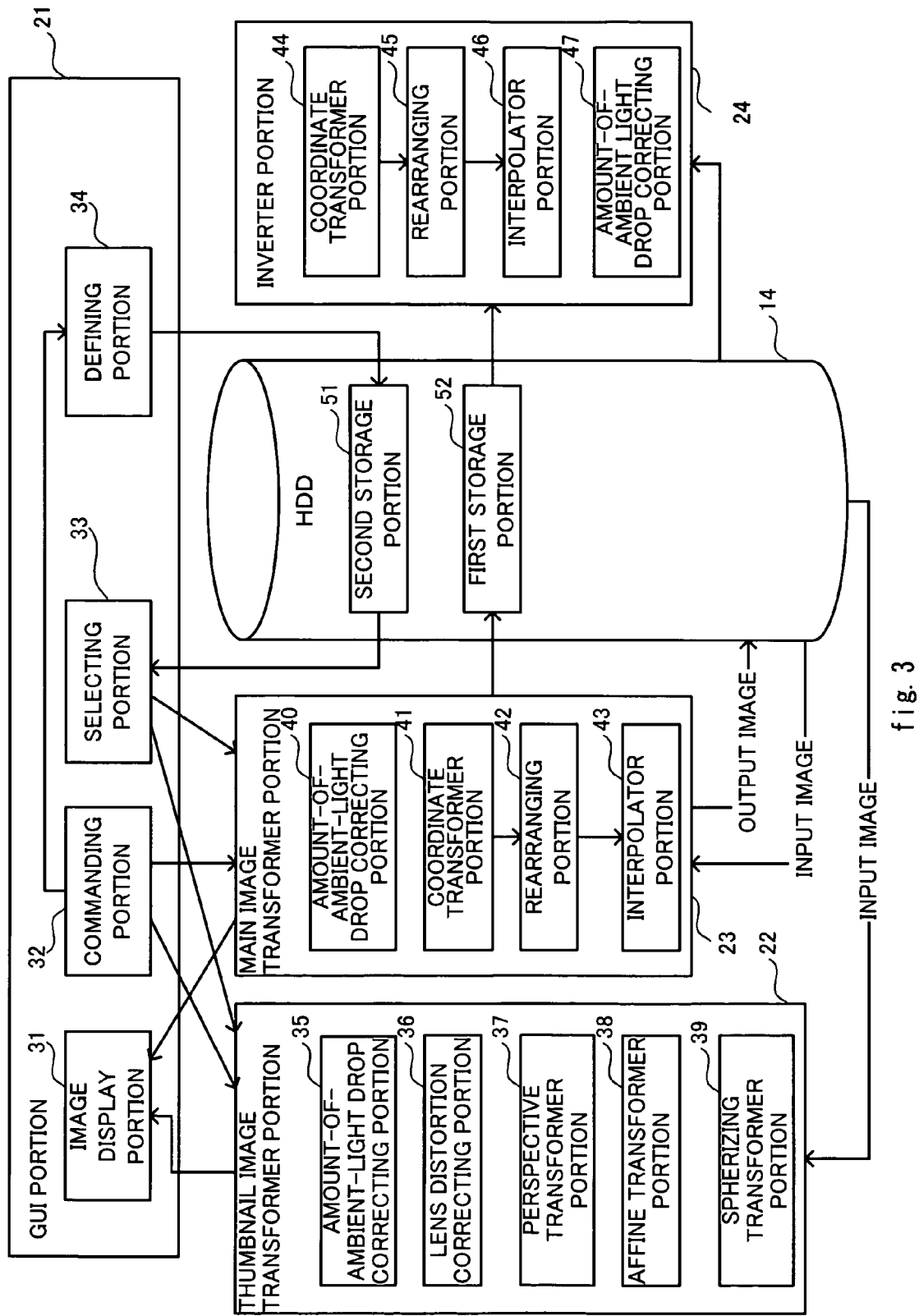
FIG. 3 is a block diagram according to an example of the invention.

FIG. 3 is a block diagram showing a logical configuration of an image processing program according to an example of the invention. An image processing program to be executed by the CPU 11 includes a Graphical User Interface (GUI) portion 21, a thumbnail image transformer portion 22, a main image transformer portion 23 and an inverter portion 24.

The GUI portion 21 includes an image display portion 31, a commanding portion 32, a selecting portion 33 and a defining portion 34. The image display portion 31 displays an input image to be transformed and an output image transformed in the thumbnail image transformer portion 22 or the main image transformer 23 on the display portion 17. The commanding portion 32 is used for selecting an image file representing an input image to be transformed, displaying, on an LCD, for example, a screen for receiving a setting such as a type of transformation for the input image and a transformation parameter therefor, and supplying an input image and a setting to the thumbnail image transformer portion 22 and the main image transformer portion 23. A second storage portion 51 stores a combination of predefined multiple image transformations (that is, a transformation set). The selecting portion 33 is used for displaying a transformation set stored in the second storage portion 51 on the display portion 17 and supplying the transformation set selected by a user through the operating portion 15 to the thumbnail image transformer portion 22 and main image transformer portion 23.

The thumbnail image transformer portion 22 includes an amount-of-ambient-light drop correcting portion 35, a lens distortion correcting portion 36, a perspective transformer portion 37, an affine transformer portion 38 and a spherizing portion 39. The thumbnail image transformer portion 22 loads data representing an input image to be transformed from HDD 14 and creates a thumbnail image of the input image. Next, every time a transformation parameter is defined through the commanding portion 32, transformations using the defined transformation parameter are performed on the thumbnail image in the transformer portions 35, 36, 37 and 38, and the transformed thumbnail image is displayed on the image display portion 31. The image transformation to be performed in each of the image transformer portions will be described later.

Figure 8:
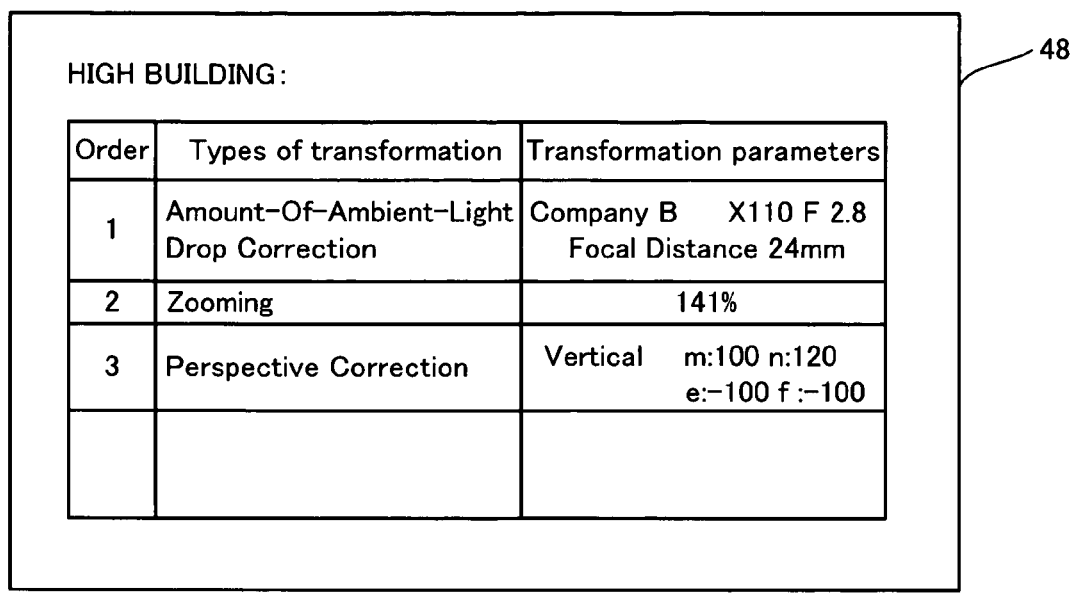
FIG. 8 is a schematic diagram according to an example of the invention.

The main image transformer portion 23 includes an amount-of-ambient-light drop correcting portion 40, a coordinate transformer portion 41, a rearranging portion 42, and an interpolator portion 43. In the main image transformer portion 23, a density correction is performed by the amount-of-ambient light drop correcting portion 40 on an original image to be transformed, and a geometric transformation, rearranging processing and interpolating processing are performed thereon in the coordinate transformer portion 41, rearranging portion 42 and interpolator portion 43. Then, the transformed and output image is displayed by the image display portion 31, and data representing the output image is stored in the HDD 14. A lens distortion correction transformation, a perspective transformation, an affine transformation and a spherizing transformation are geometric transformations. Details of these transformations will be described later. The main image transformer portion 23 stores, in the first storage portion 52, a combination of transformation parameters used for transformations and an order of the transformations in association with a path to the transformed image stored in the HDD 14. Information representing a combination of transformation parameters to be used for transformations and an order of the transformations is called a transformation set herein. One transformation set is stored in one transformation set table 48 shown in FIG. 8, and a number of transformation set tables equal to the number of transformation sets is stored in the first storage portion 52. Storing a transformation set in association with an output image allows the inverse transformation of the output image to the original input image.

The inverter portion 24 includes a coordinate transformer portion 44, a rearranging portion 45, an interpolator portion 46, and an amount-of-ambient light drop correcting portion 47. In the inverter portion 24, a transformation set table and an image file stored in association with the transformation set table are loaded from the HDD 14 and a inverse transformation is performed on the transformed image file based on the transformation set table. The amount-of-ambient-light drop correcting portion 40 performs an inverse transformation for the amount-of-ambient light drop correction. The coordinate transformer portion 44, rearranging portion 45 and interpolator portion 46 perform inverse transformation of each coordinate transformation, and rearranging processing and interpolating processing.

Next, various kinds of transformation processing according to an example of the invention will be described.

The amount-of-ambient-light drop correction to be performed by the amount-of-ambient-light drop correcting portion 40 of the main image transformer portion 23 corrects pixel values of a peripheral area of an image in accordance with a lens characteristic of a digital camera to be used for shooting since pixels corresponding to the peripheral part of the lens are darker than pixels corresponding to the center part of the lens in an area sensor of the digital camera. Here, the correction is for a focused pixel p, (x,y) in an input image having a width W in the X-direction and a height H in the Y-direction. A rate m of drop in amount of light at the focused pixel p (x,y) due to a drop in amount of ambient light can be expressed by:

$$m = 1.0 - f(\theta \times d/k, E)$$

where:

$$k = \sqrt{\left(\frac{W}{2}\right)^2 + \left(\frac{H}{2}\right)^2}, \quad d = \sqrt{\left(\frac{W}{2} - x\right)^2 + \left(\frac{H}{2} - y\right)^2},$$

a maximum amount of light drop rate function, $$f(\theta, E) = (\cos \theta)^4 \times E/100.0 + (1.0 - E/100.0),$$

and θ is ½ of an angle of diagonal view determined by a diagonal distance of a photoreceptor portion of an area sensor used for shooting and a focal distance of a lens, and E is an enhancement coefficient. The enhancement coefficient is a coefficient determined by a combination of lens and aperture characteristics of a camera. The correction performed in the amount-of-ambient-light drop correcting portion 40 corrects pixel values, R, G and B to:

$$R = r/m, \ G = g/m \text{ and } B = b/m$$

where r, g and b are original pixel values of the focused pixel p (x,y).

Furthermore, the same correction is also performed on a thumbnail image of the input image in the amount-of-ambient-light drop correcting portion 35 in the thumbnail image transformer portion 22.

In the coordinate transformer portion 41 of the main image transformer portion 23, image coordinates of an input image are transformed to image coordinates of the output image or image coordinates of the output image are transformed to image coordinates of the input image by using a combination of multiple transformation equations. Thus, a correspondence between the image coordinates of the input image and the image coordinates of the output image can be obtained. The coordinate transformation to be performed in the coordinate transformer portion 41 may be a lens distortion correction, a perspective transformation for a perspective correction, an affine transformation for zooming and/or rotation, and/or a spherizing transformation for portrait thickness correction. The order of these geometric transformations may be defined by a user or may be a recommended order defined by a manufacturer in advance.

The lens distortion correction is a geometric transformation for correcting an input image distorted to a bobbin shape or barrel shape due to a distortion aberration of a lens used for shooting. Lens distortion correction transforms a focused pixel p (x,y) to P (X,Y) by:

$$\text{Center} \times x = \frac{\text{Width}}{2} \quad \text{Center} \times y = \frac{\text{Height}}{2} \quad \text{CoefPer} = \frac{\text{Coef}}{100}$$

A ratio of a square value of a distance from the center $$\text{Before correction: } Per = \frac{(x - \text{Center} \times x)^2 + (y - \text{Center} \times y)^2}{\text{Center} \times x^2 + \text{Center} \times y^2}$$

$$\text{After correction: } per = \frac{(X - \text{Center} \times x)^2 + (Y - \text{Center} \times y)^2}{\text{Center} \times x^2 + \text{Center} \times y^2}$$

Distance from the center of the coordinates:

$$\text{Before correction: } r = \sqrt{(X - \text{Center} \times X)^2 + (Y - \text{Center} \times y)^2}$$

$$\text{After correction: } R = \sqrt{(x - \text{Center} \times x)^2 + (y - \text{Center} \times y)^2}$$

A distortion rate (Coef>0) for correction of barrel-shaped distortion $$\text{Dist} = 1.0 - (\text{CoefPer} \times \text{Per})$$

A distortion rate (Coef<0) for correction of bobbin-shaped distortion $$\text{Dist} = 1.0 + ((\text{CoefPer} \times 0.5) \times (1.0 - \text{Per}))$$

Coordinates (x,y) of the original image is obtained by:

$$x = \frac{X - \text{Center} \times x}{\text{Dist}} + \text{Center} \times x$$

$$y = \frac{Y - \text{Center} \times y}{\text{Dist}} + \text{Center} \times y$$

A perspective transformation performs a geometric transformation on an input image created by shooting a high building from a position above the ground to an image created by shooting the high building from the front. A perspective transformation transforms a focus pixel p (x,y) to P (X,Y) expressed by:

$$X = (ax + by + c)/(px + qy + r)$$

$$Y = (dx + ey + f)/(px + qy + r)$$

where a, b, c, d, e, f, p, q, and r are parameters depending on the center of perspective transformation on an image and a vertical or horizontal zoom ratio of the image.

An affine transformation is a geometric transformation that zooms in or out or rotates an entire image. An affine transformation transforms a focused pixel p (x,y) to P (X,Y) expressed by:

$$X = gx + hy + i, \quad Y = jx + ky + l$$

where g, h, i, j, k and l are parameters depending on a zoom ratio and an angle of rotation.

A spherizing transformation is a geometric transformation that stretches or shrinks a target area without changing an aspect ratio of an entire image. For example, a spherizing transformation is performed for stretching a human area in a target image so that an image representing a thicker person than a real subject can be created. A spherizing transformation transforms a focused pixel p (x,y) to P (X,Y) expressed by:

$$X = m_1 x^3 + n_1 x^2 + s_1 x + t_1, \quad Y = m_2 y^3 + n_2 y^2 + s_2 y + t_2$$

where $m_1$, $n_1$, $s_1$, $t_1$, $m_2$, $n_2$, $s_2$, and $t_2$ are parameters depending on a length and width of an image, a strength and direction of a transformation and the center position of the transformation. The direction of a transformation refers to stretching or shrinking an image.

In addition to these image transformations, geometric transformations such as a skew transformation and a secondary isometric transformation, a shade information transformation such as a contrast transformation, color transformation and so on may be performed in the main image transformer portion 23.

Figure 4:
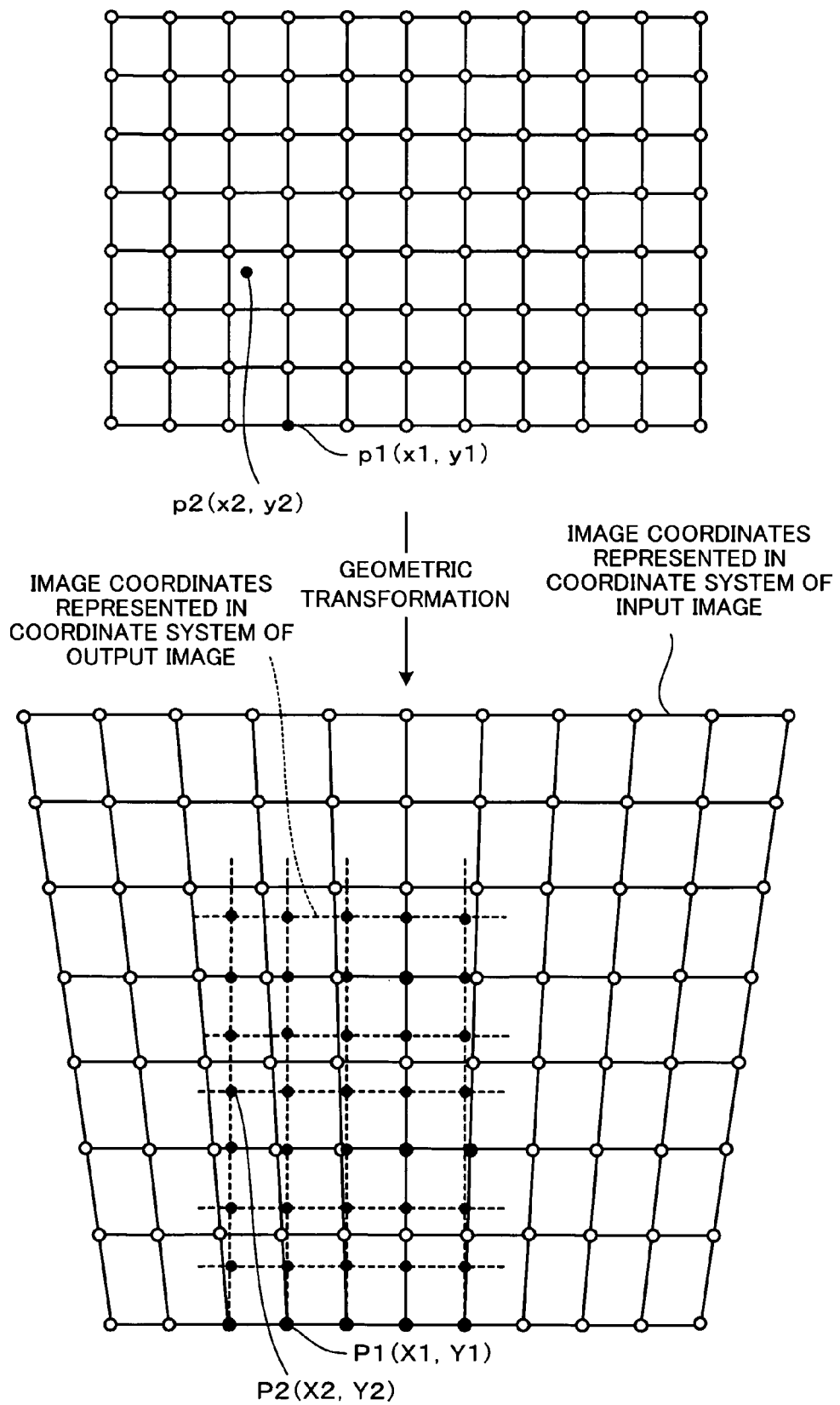
FIG. 4 is a schematic diagram according to an example of the invention.

FIG. 4 is a schematic diagram showing correspondences between image coordinates before and after a geometric transformation. In FIG. 4, grid points on solid lines represent an arrangement of pixels included in the images before and after a geometric transformation in a coordinate system of the image before the geometric transformation. Grid points on broken lines represent the arrangement of the pixels included in the image after the geometric transformation in a coordinate system of the image after the geometric transformation.

Rearranging processing to be performed in the rearranging portion 42 rearranges image data of an image before a geometric transformation so as to correspond to a grid arrangement of the image after the geometric transformation. For example, a rearrangement may be performed by defining a pixel value of a pixel p1 (x1,y1) in an image before a geometric transformation for the pixel p1 to a pixel value of the pixel p1 (x1,y1) of the image after the geometric transformation. However, a pixel in an image before a geometric transformation, which corresponds to a pixel in an image after the geometric transformation, does not always exist. For example, image coordinates p2 (x2,y2) in an image before a geometric transformation, that corresponds to a pixel P2 (X2, Y2) in an image after the geometric transformation, does not exist on grid points in a coordinate system before the geometric transformation. Therefore, the pixel value, which corresponds to the pixel P2, of the image before the geometric transformation does not exist.

The interpolator portion 43 performs interpolating processing on a space pixel after a geometric transformation, which does not have the corresponding pixel in an image before the geometric transformation, that is, on image coordinates before the geometric transformation, which are not arranged on grid points in a coordinate system of the image after the transformation. The interpolating method may be a bi-linear interpolation or a cubic convolution interpolation. Alternatively, a nearest neighbor interpolation may be used as an interpolating method. Image data of an output image created in the interpolator portion 43 is stored in the HDD 14.

Figure 5:
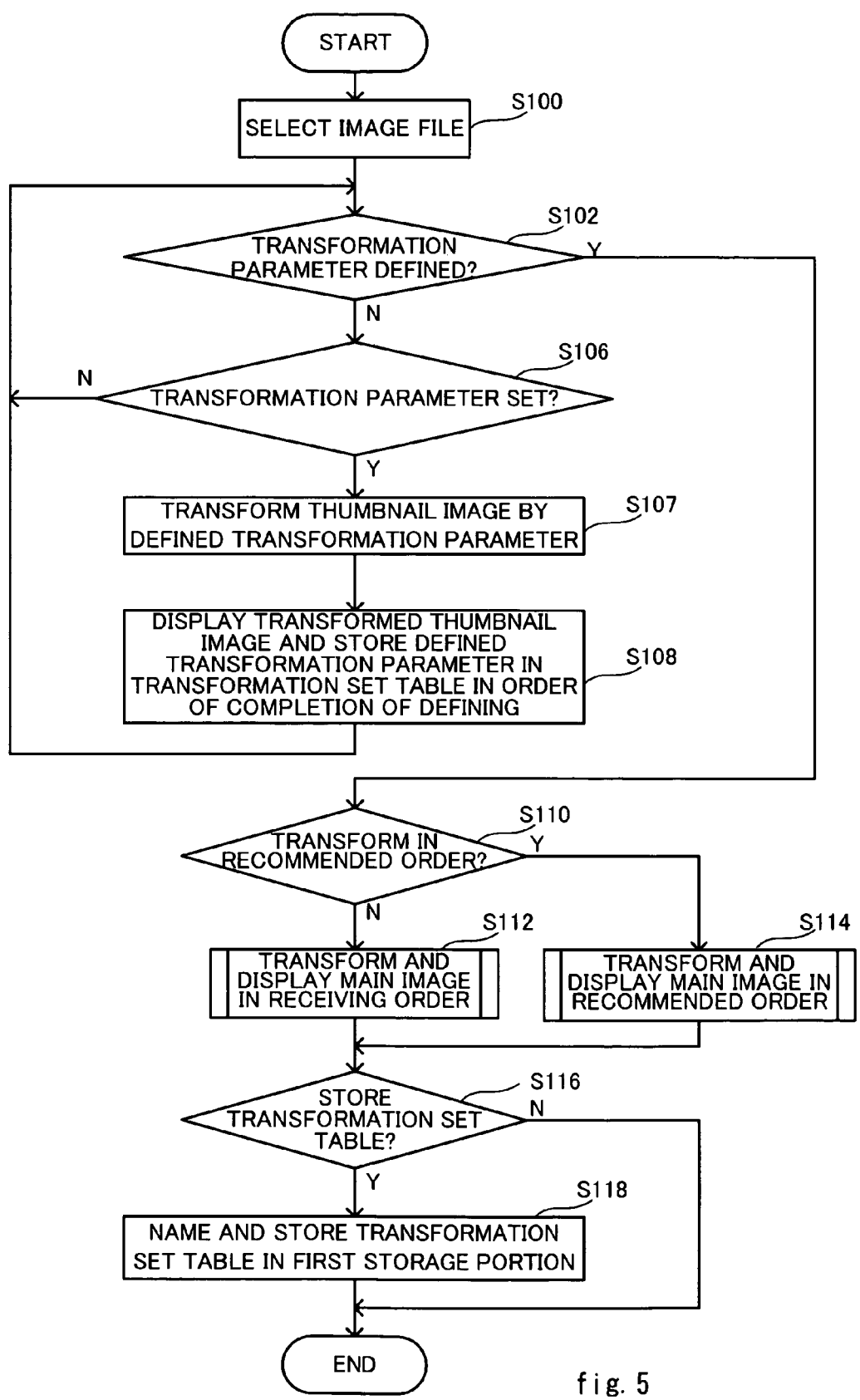
FIG. 5 is a flowchart according to an example of the invention.

FIG. 5 is a flowchart illustrating processing for transforming an image by an image processing program according to an example of the invention.

Figure 6:
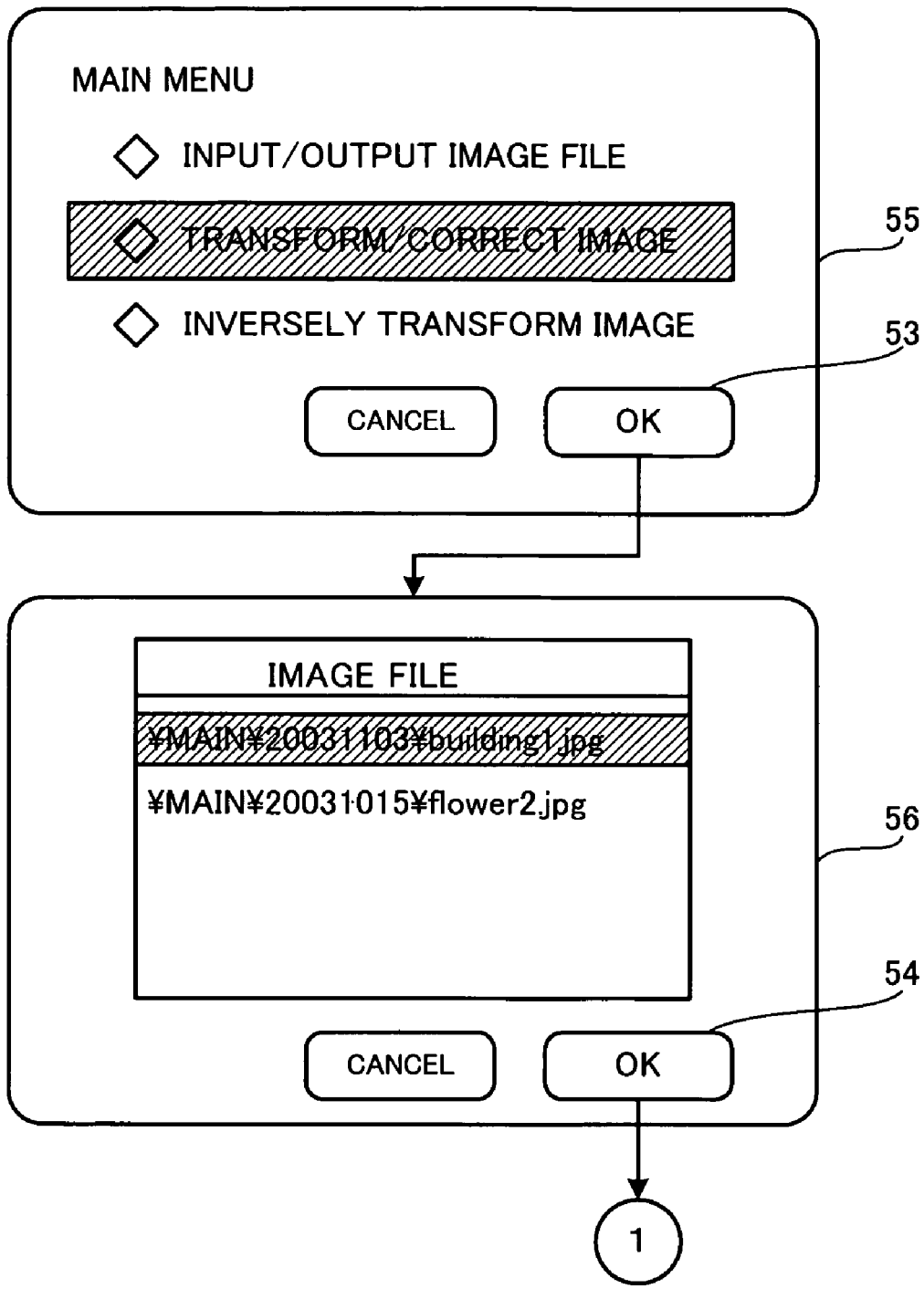
FIG. 6 is a schematic diagram according to an example of the invention.
Figure 7:
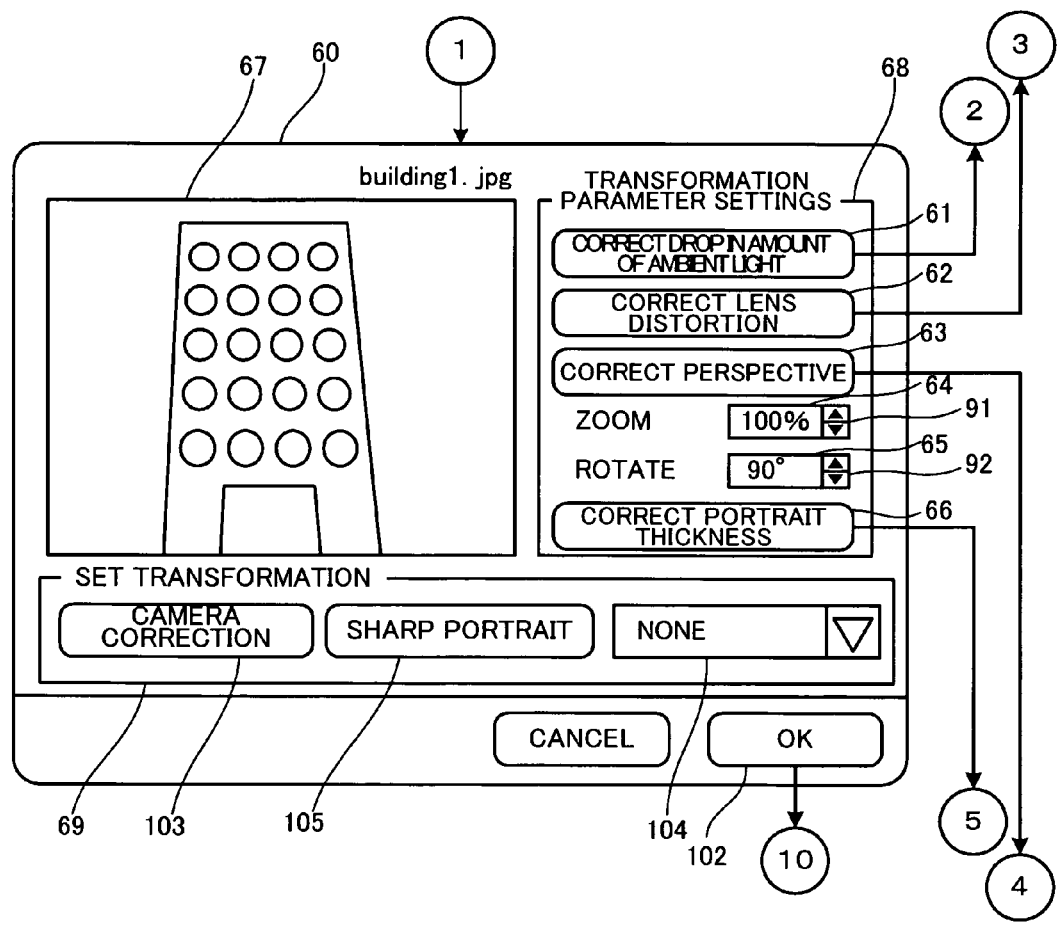
FIG. 7 is a schematic diagram according to an example of the invention.

First of all, when "TRANSFORM/CORRECT IMAGE" is selected and an "OK" button 53 is clicked on a main menu screen 55 shown in FIG. 6, an image file select screen 56 is displayed. When, on the image file select screen 56, image files stored in a predetermined folder in the HDD 14 is displayed, an image file is selected, and an "OK" button 54 is clicked, the image file representing an input image to be transformed is selected (step S100). When the image file representing an input image is selected, the image processor 10 loads the selected image file from the HDD 14 to the RAM 13, creates a thumbnail image of the selected image file and displays, on the display portion 17, an image transformation main screen 60 shown in FIG. 7. The thumbnail image of the selected image file is displayed on a preview area 67 of the image transformation main screen 60. When the image processor 10 loads the selected image file from the HDD 14 to the RAM 13, the image processing program causes the CPU 11 to function as a unit for obtaining an input image.

Defining transformation parameters ends in response to a click on an "OK" button 102 of the main screen 60 in step S102. When defining transformation parameters ends, an input image representing an image file is transformed based on a defined parameter in step S110 and subsequent steps.

In step S106, an operation for defining transformation parameters is received. The receipt of an operation for defining a transformation parameter corresponds to a receipt of a transformation command. For example, an operation for defining a transformation parameter for an affine transformation is received as follows. When, on the image transformation main screen 60, an up-down switch 91 is manipulated through a mouse, for example, of the operating portion 15 and the zoom ratio in a box 64 is changed thereby, a transformation parameter is defined for an affine transformation for the zooming transformation. When an up-down switch 92 is manipulated by a mouse, for example, of the operating portion 15 and the angle of rotation in a box 65 is changed thereby, a transformation parameter is defined for an affine transformation for the rotation. When a transformation parameter is defined, the affine transformation is performed on a thumbnail image to be transformed based on the defined transformation parameter in the affine transformer portion 38 of the thumbnail image transformer portion 22 (step S107). Next, the transformed thumbnail image is displayed on a preview area 67, and the defined transformation type and transformation parameter are added in the last row of the transformation set table 48 shown in FIG. 8 (step S108).

Figure 9:
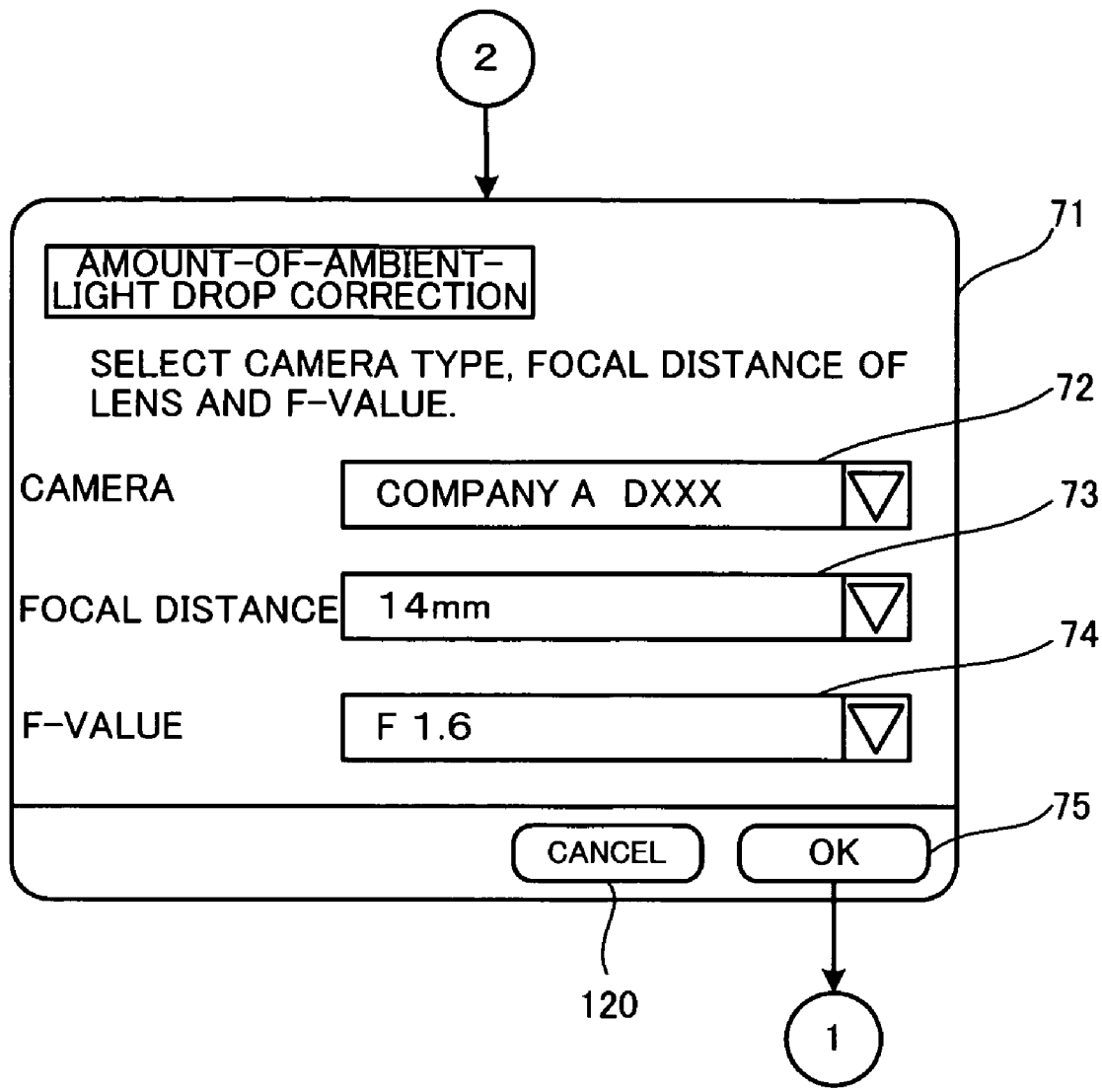
FIG. 9 is a schematic diagram according to an example of the invention.

An operation for defining a transformation parameter for correcting a drop in an amount of ambient light is received as follows. When, on the main screen 60, a "CORRECT DROP IN AMOUNT OF AMBIENT LIGHT" button 61 is clicked, the image processor 10 displays, on the display portion 17, a setting screen 71 for an amount-of-ambient-light drop correction shown in FIG. 9. A proper transformation parameter for a correction of a drop in amount of ambient light depends on a camera type selected through a pull-down menu 72, a focal distance of a lens selected through a pull-down menu 73 and an aperture selected through a pull-down menu 74. When an "OK" button 75 is clicked, transformation parameters required for the amount-of-light drop correction are defined in accordance with the camera type, focal distance of the lens and aperture selected through the pull-down menus 72, 73 and 74 (step S106). When a "CANCEL" button 120 is clicked on the setting screen 71 for the amount-of-ambient-light drop correction, no transformation parameter is defined. When the "OK" button 75 is clicked on the setting screen 71 for the amount-of-ambient-light drop correction, a drop in amount of ambient light on the thumbnail image to be transformed is corrected in the amount-of-ambient-light drop correcting portion 35 of the thumbnail image transformer portion 22 based on the defined transformation parameters (step S107).

Figure 10:
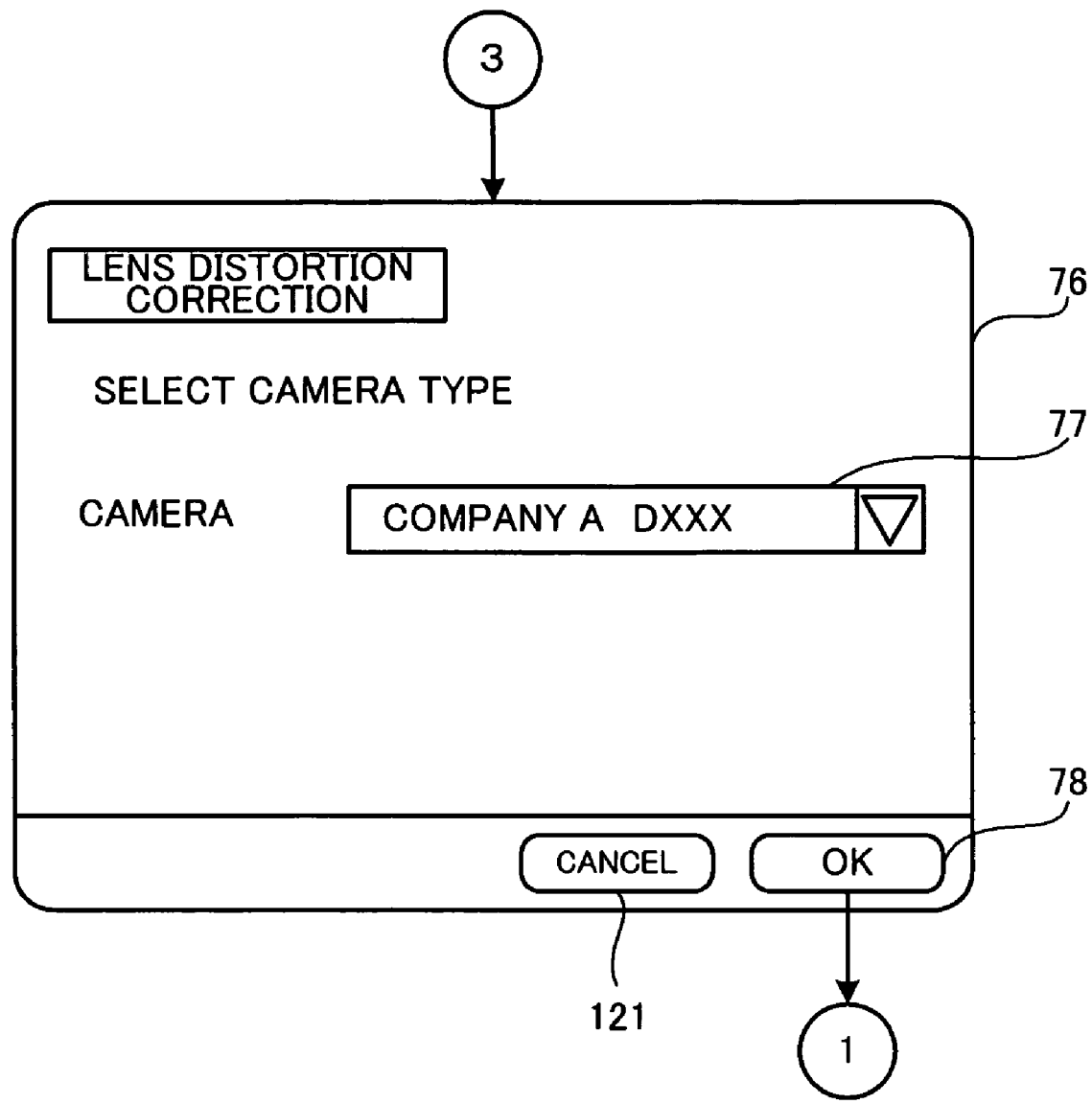
FIG. 10 is a schematic diagram according to an example of the invention.

An operation of defining a transformation parameter for correcting a lens distortion is received as follows. When, on the main screen 60, a "CORRECT LENS DISTORTION" button 62 is clicked, the image processor 10 displays, on the display portion 17, a setting screen 76 for lens distortion correction shown in FIG. 10. A proper transformation parameter for correction of a lens distortion depends on a camera type selected through a pull-down menu 77. When an "OK" button 78 is clicked, a transformation parameter required for correcting a lens distortion is defined in accordance with the camera type selected through the pull-down menu 77 (step S106). When a "CANCEL" button 121 is clicked on the setting screen 76 for lens distortion correction, no transformation parameter is defined. When the "OK" button 78 is clicked on the setting screen 76 for lens distortion correction, a lens distortion in the thumbnail image to be transformed is corrected in the lens distortion correcting portion 36 of the thumbnail image transformer portion 22 based on the defined transformation parameter (step S107).

Figure 11:
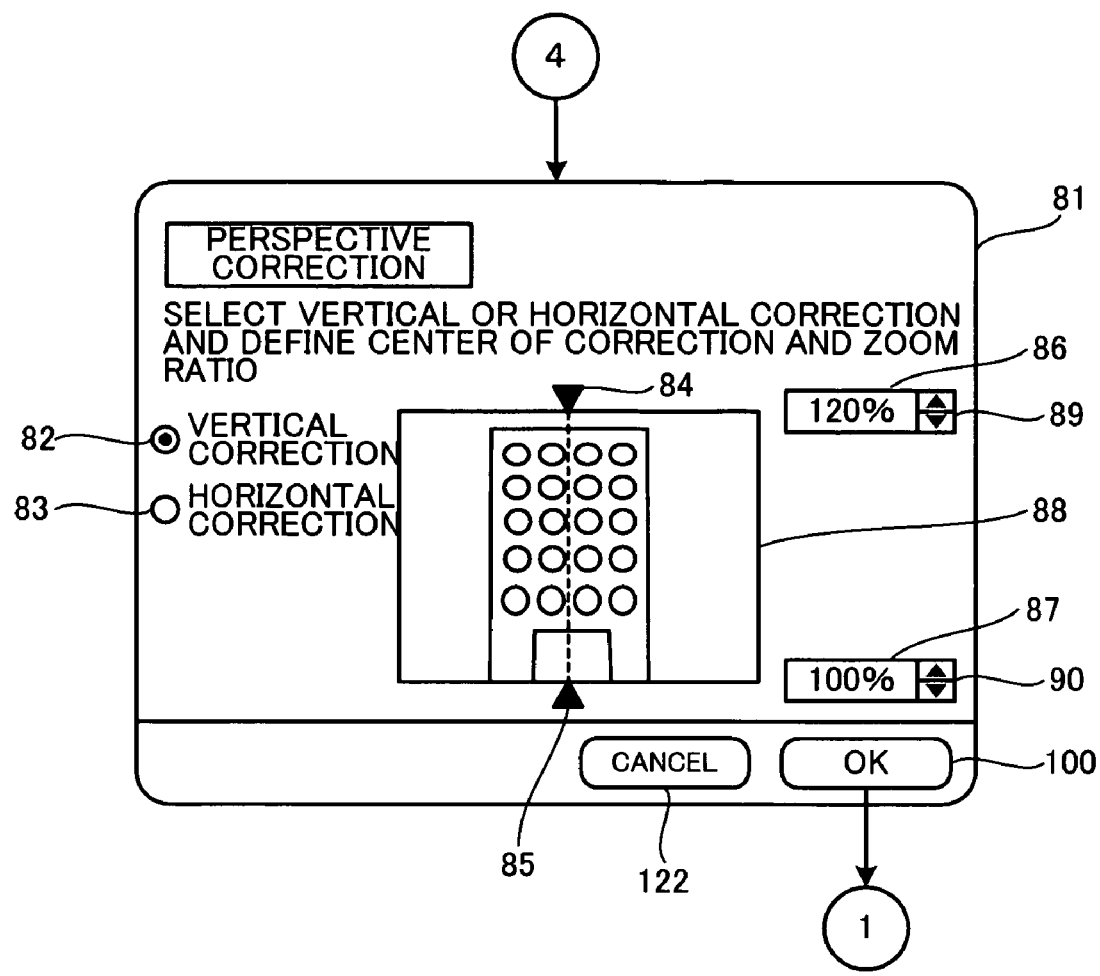
FIG. 11 is a schematic diagram according to an example of the invention.

An operation of defining a transformation parameter for perspective transformation is received as follows. When, on the main screen 60, a "CORRECT PERSPECTIVE" button 63 is clicked, the image processor 10 displays, on the display portion 17, a setting screen 81 for perspective correction shown in FIG. 11. For example, when a radio button 82 is clicked, "vertical correction" is selected, and pointers 84 and 85 are displayed at the top and bottom of a thumbnail image display portion 88. A user may define the center of a perspective transformation by moving the pointers 84 and 85 to the left or right through a manipulation on a mouse, for example, of the operating portion 15. Furthermore, a user may define a zoom ratio by manipulating up/down switches 89 and 90 provided in the boxes 86 and 87 through a mouse, for example, of the operating portion 15. In the example in FIG. 11, the box 86 indicates a zoom ratio for the upper part of an image, and the box 87 indicates a zoom ratio for the lower part of the image. When an "OK" button 100 is clicked, a transformation parameter for a perspective transformation is defined in accordance with the center of the correction selected through the pointers 84 and 85 and the zoom ratio defined through the boxes 86 and 87 (step S106). When a "CANCEL" button 122 is clicked on the setting screen 81 for a perspective correction, no transformation parameter is defined. When the "OK" button 100 is clicked on the setting screen 81 for perspective correction, the perspective transformation is performed on the thumbnail image to be transformed in the perspective transformer portion 37 of the thumbnail image transformer portion 22 based on the defined transformation parameter (step S107).

Figure 12:
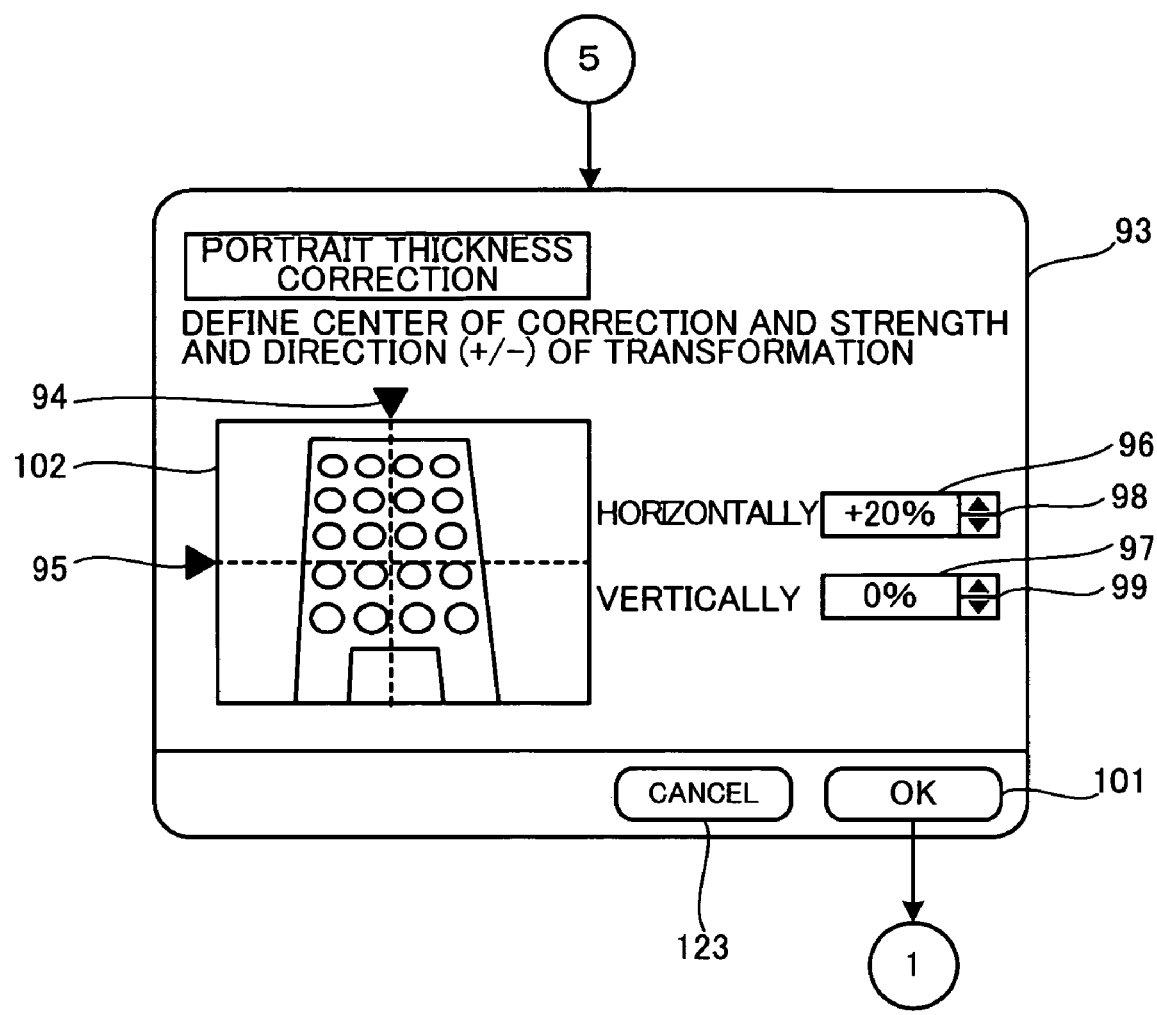
FIG. 12 is a schematic diagram according to an example of the invention.

An operation of defining a transformation parameter for spherizing transformation is received as follows. When, on the main screen 60, a "CORRECT PORTRAIT THICKNESS" button 66 is clicked, the image processor 10 displays, on the display portion 17, a setting screen 93 for portrait thickness correction shown in FIG. 12. The center of a perspective transformation may be defined by moving the pointer 94 to the left or right and/or the pointer 95 to the above or bottom through a manipulation on a mouse, for example, of the operating portion 15. Furthermore, strengths of vertical and horizontal transformations may be defined by manipulating up/down switches 98 and 99 provided in the boxes 96 and 97 through a mouse, for example, of the operating portion 15. When an "OK" button 101 is clicked, a transformation parameter for a spherizing transformation is defined in accordance with the center selected through the pointers 94 and 95 and the horizontal and vertical zoom ratios defined through the boxes 96 and 97 (step S106). When a "CANCEL" button 123 is clicked on the setting screen 93 for portrait thickness correction, no transformation parameter is defined. When the "OK" button 101 is clicked on the setting screen 93 for portrait thickness correction, the spherizing transformation is performed on the thumbnail image to be transformed in the spherizing transformer portion 39 of the thumbnail image transformer portion 22 based on the defined transformation parameter (step S107).

Up to this point, steps S106, S107 and S108 shown in FIG. 5 have been described above. Next, an image transformation on a main image in step S110 and subsequent steps shown in FIG. 5 will be described below.

Figure 13:
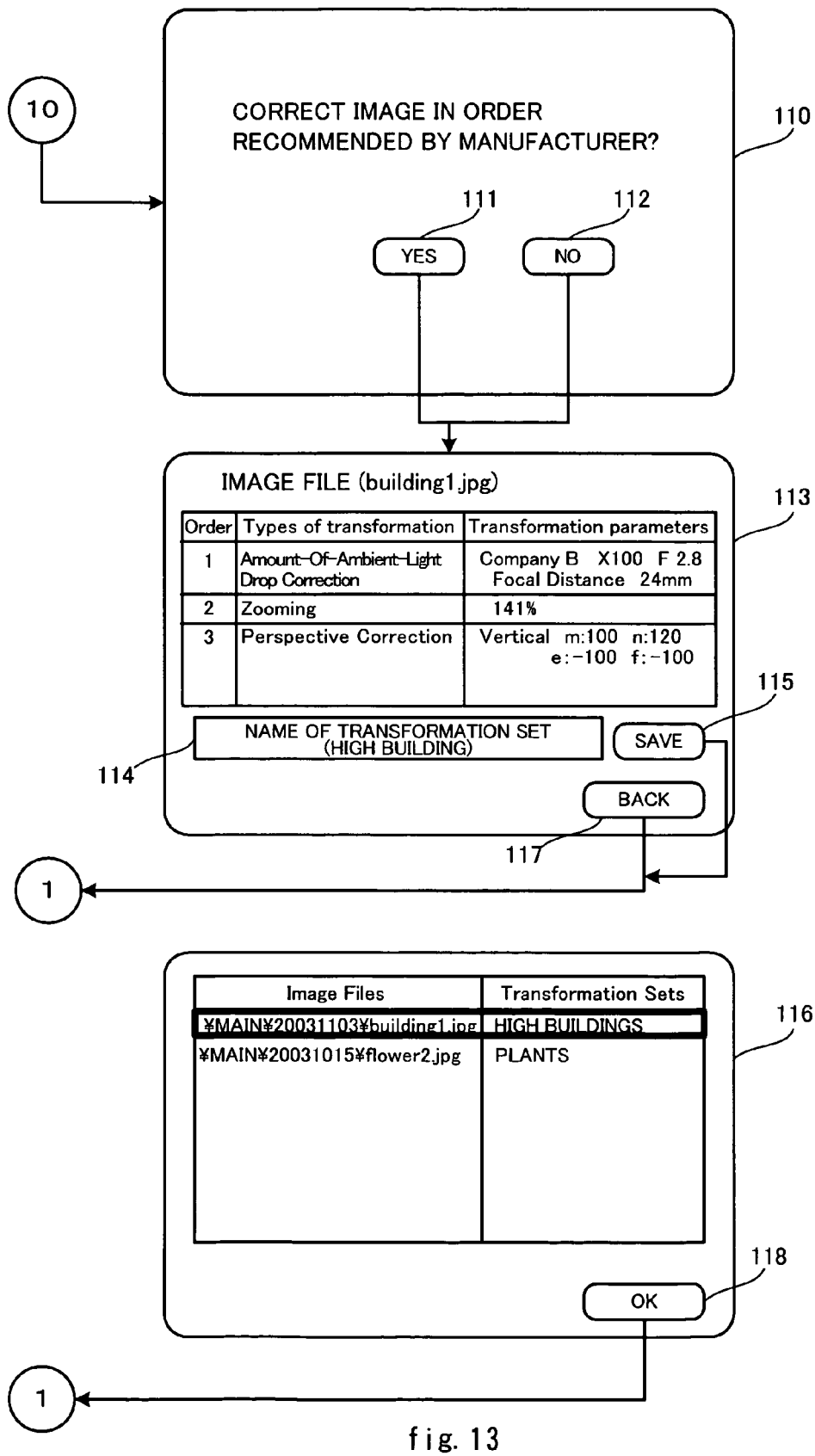
FIG. 13 is a schematic diagram according to an example of the invention.

When the "OK" button 102 is clicked on the image transformation main screen 60, the image processor 10 determines that a transformation parameter has been defined (step S102) and displays a screen 110 shown in FIG. 13 and prompts a user to select either transforming a main image to be transformed in an order defined by the user or transforming the main image to be transformed in a recommended order predetermined independently of a user-defined order (step S110). When an "YES" button 111 is clicked on the screen 110, the image processing program changes a transformation order recorded in the transformation set table 48 to the order of an amount-of-ambient-light drop correction, a lens distortion correction, a perspective transformation, zooming and rotation (affine transformation) and then spherizing transformation, transforms a main image of the image file representing an input image in the changed order, and displays the transformed main image (output image) on the preview area 67 of the image transformation main screen 60 (step S114).

When a "NO" button 112 is clicked on the image transformation main screen 60, the image processing program transforms a main image in an order in accordance with a manipulation for defining a transformation parameter and displays the transformed main image (output image) on the preview area 67 of the image transformation main screen 60 (step S112).

Figure 14:
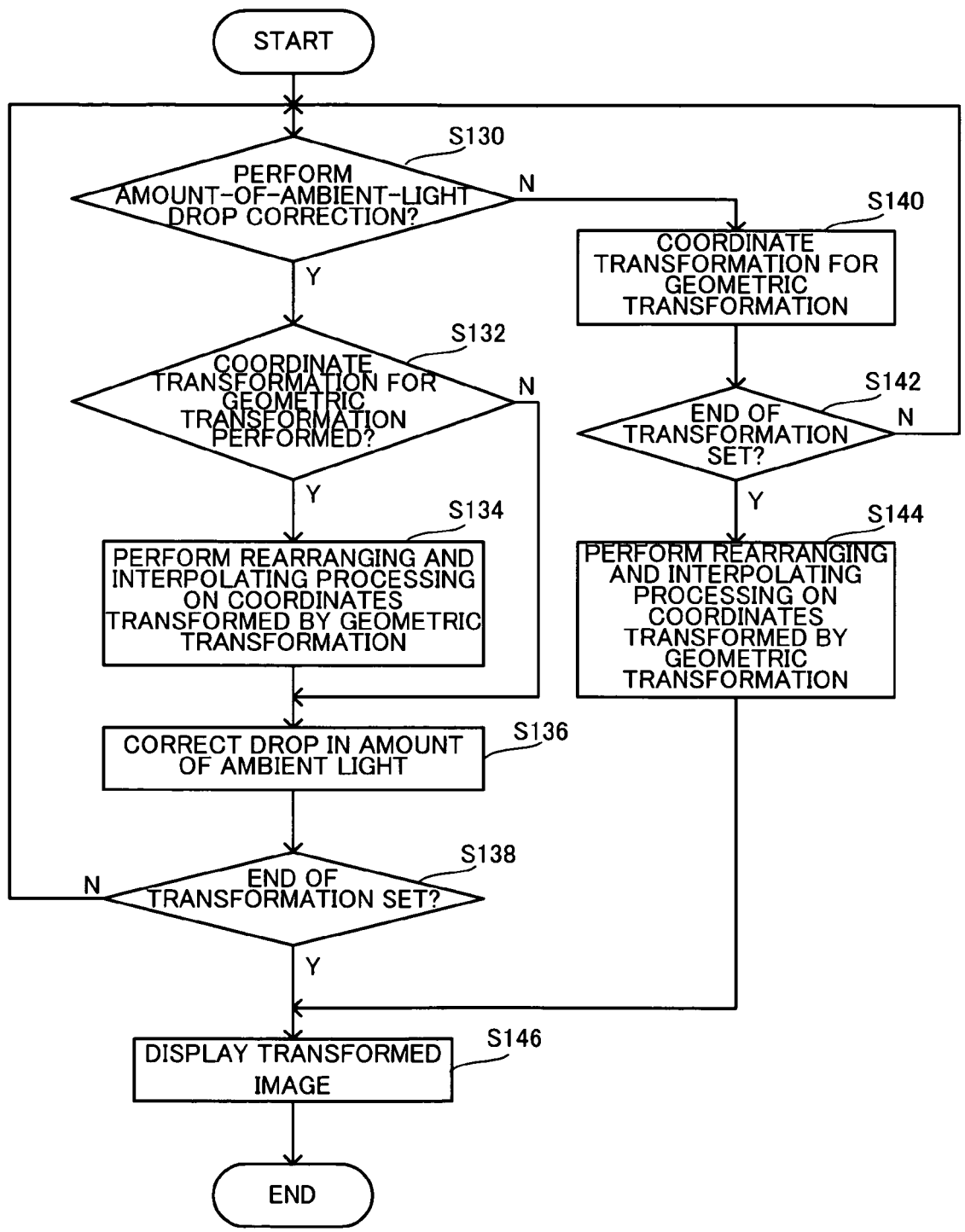
FIG. 14 is a flowchart according to an example of the invention.

FIG. 14 is a flowchart illustrating a detail processing flow in step S112. In step S112, image transformations recorded in rows of the transformation set table 48 are performed in order from the first row to the last row. First of all, it is determined whether a transformation type for a target row is an amount-of-ambient-light drop correction or not (step S130) If not, a coordinate transformation of geometric transformation recorded at the target row is performed (step S140). Next, if the target row is the last row of the transformation set table 48, the end of the transformation set is determined (step S142), and rearranging processing and interpolating processing are performed for a geometric transformation in which only the coordinate transformation has been performed (step S144). Here, even when multiple geometric transformations exist in which only the coordinate transformations have been performed, each of rearranging processing and interpolation processing is performed only once. In step S142, it is determined whether the target row is the last row or not. If not, the processing returns to step S130 where the next row of the target row is handled as a new target row, and the same processing is performed thereon. In other words, when transformations are sequentially performed with reference to the transformation set table 48, coordinate transformations of geometric transformations are performed only in step S140 until a row to undergo an amount-of-ambient light drop correction is selected.

If the type of the transformation to be performed on a target row in step S130 is an amount-of-ambient light drop correction, it is determined whether any geometric transformation exists in which only the coordinate transformation has been performed in step S140 but rearranging and interpolating processing has not been performed yet (step S132). If so, rearranging and interpolating processing is performed for the geometric transformation in which only the coordinate transformation has been performed (step S134). Here, even when multiple geometric transformations exist in which only the coordinate transformations have been performed, rearranging processing and interpolating processing are performed only once.

If it is determined in step S132 that no geometric transformation exists in which only the coordinate transformation has been performed in step S140 but rearranging and interpolating processing has not been performed, the processing advances to step S136. In step S136, an amount-of-ambient-light drop correction is performed on a main image to be transformed. Next, it is determined whether the target row is the last row or not (step S138). If not, the processing returns to step S130. If so, it is determined that all commands for transformations have been completed, and the processing advances to step S146.

When the transformations have been performed to the last row of the transformation set table 48, the output image is displayed on the preview area 67, and the image data representing the output image is stored in the HDD 14 (step S146). Up to this point, the detail processing flow in step S112 has been described.

Figure 1:
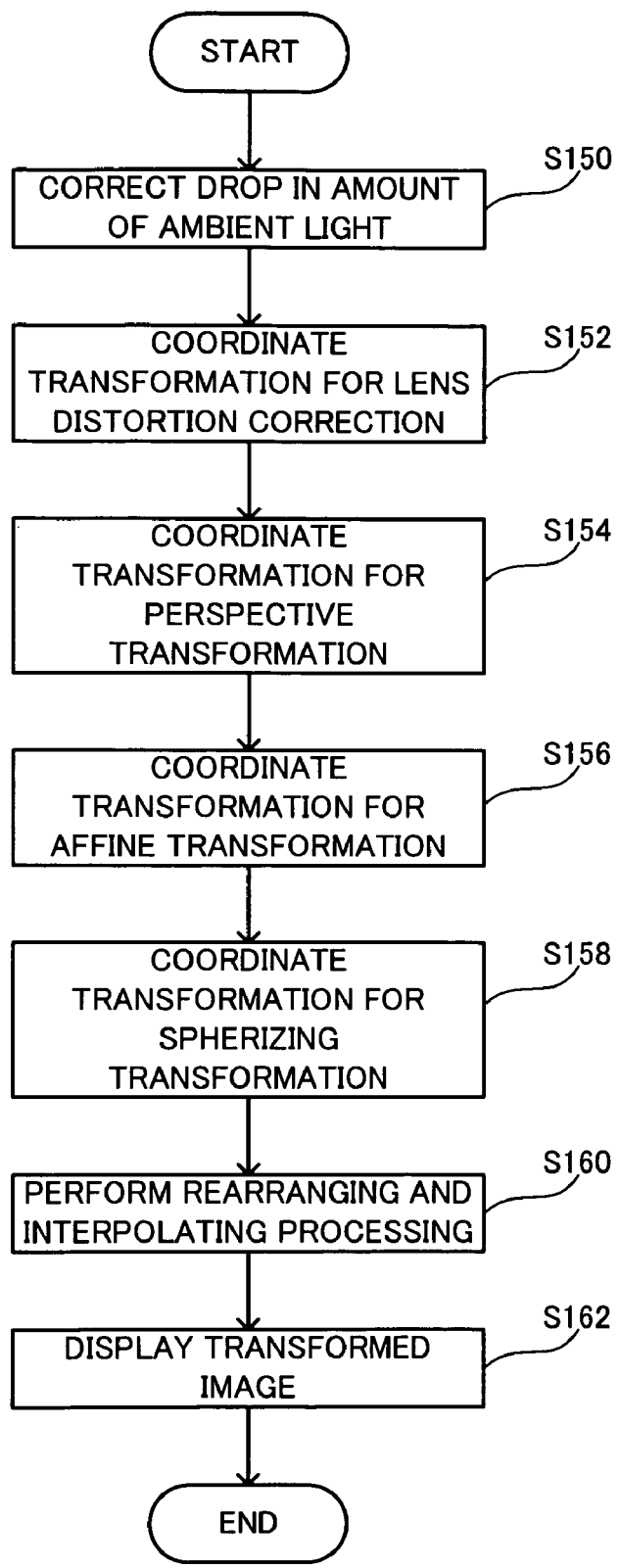
FIG. 1 is a flowchart according to an example of the invention.

FIG. 1 is a flowchart illustrating a detail processing flow in step S114. An image transformation in step S114 is performed on a main image to be transformed with reference to the transformation set table 48 having transformations in a changed order.

First of all, an amount-of-ambient-light drop correction is performed on a main image (input image) to be transformed (step S150). This is because the amount-of-ambient-light drop correction performed after a geometric transformation performs an amount-of-light drop correction on an area, which does not correspond to the peripheral part of a lens when a digital camera records the image data.

Next, a coordinate transformation for lens distortion correction (step S152), a coordinate transformation of a perspective transformation for perspective correction (step S154), a coordinate transformation for affine transformation (step S156) and a coordinate transformation for spherizing transformation (step S158) are performed on a main image to be transformed. Next, after all of the coordinate transformations of the geometric transformation have been completed, rearranging and interpolating processing is performed on the entire image only once, and image data representing the output image is created (step S160). Here, all of the space pixels are interpolated only once independently of the number of geometric transformations. In other words, a correspondence between image coordinates of an input image and image coordinates of the final output image is obtained based on multiple coordinate transformation equations first without performing rearranging processing and interpolating processing for each geometric transformation. Then, rearranging processing and interpolation processing are performed thereon only once, and pixel values are defined for all pixels of the output image. Thus, image data of the output image is created.

Finally, the output image is displayed on the preview area 67, and the image data representing output image is stored in the HDD 14. Up to this point, the detail processing flow in step S114 has been described.

Subsequent to step S112 or step S114, the image processor 10 displays a transformation set displaying screen 113 shown in FIG. 13 on the display portion 17 and prompts a user to select either storing the transformation set table in the HDD 14 or not (step S116). The transformation set displaying screen 113 displays the transformation set stored in the transformation set table 48 and a file name of the output image created by the transformation set. An arbitrary name of the transformation set can be input to a transformation set name input area 114, and, when a "SAVE" button 115 is clicked, the transformation set table 48 is file-stored in a first storage portion 52 of the HDD 14 in connection with a path to the image file representing the output image (step S118). Here, the name of the transformation set input to the transformation set name input area 114 is given to the file name in the transformation set table 48.

Figure 15:
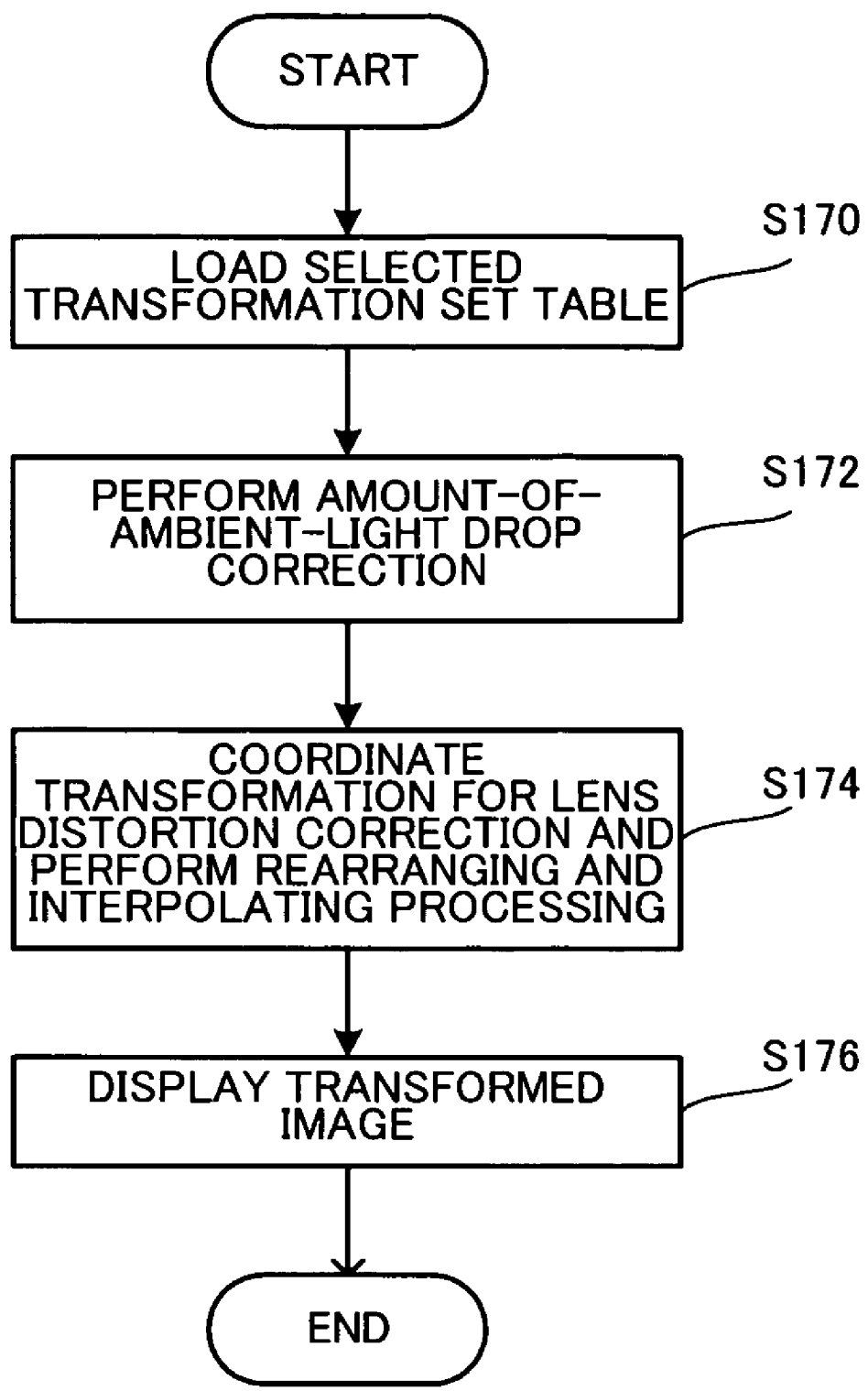
FIG. 15 is a flowchart according to an example of the invention.

Next, a set transformation will be described with reference to FIG. 15. A set transformation is a transformation to be performed on an input image based on a transformation set table created by a manufacturer in advance in order to obtain a desired transformed image without requiring a user to define each transformation type and transformation parameter. For example, when, on the main screen 60, a "CAMERA CORRECTION" button 103 is clicked, an image program loads the transformation set table having a file name, "CAMERA CORRECTION" stored in a second storage portion 51 in advance (step S170). Next, an amount-of-ambient-light drop correction is performed thereon based on the loaded transformation set table (step S172). Next, a coordinate transformation and rearranging and interpolating processing for a lens distortion transformation are performed thereon (step S174). Finally, the transformed output image is displayed on the preview area 67 (step S176).

Alternatively, a transformation set table created by a user may be selected as a transformation set table to be used for a set transformation.

Figure 16:
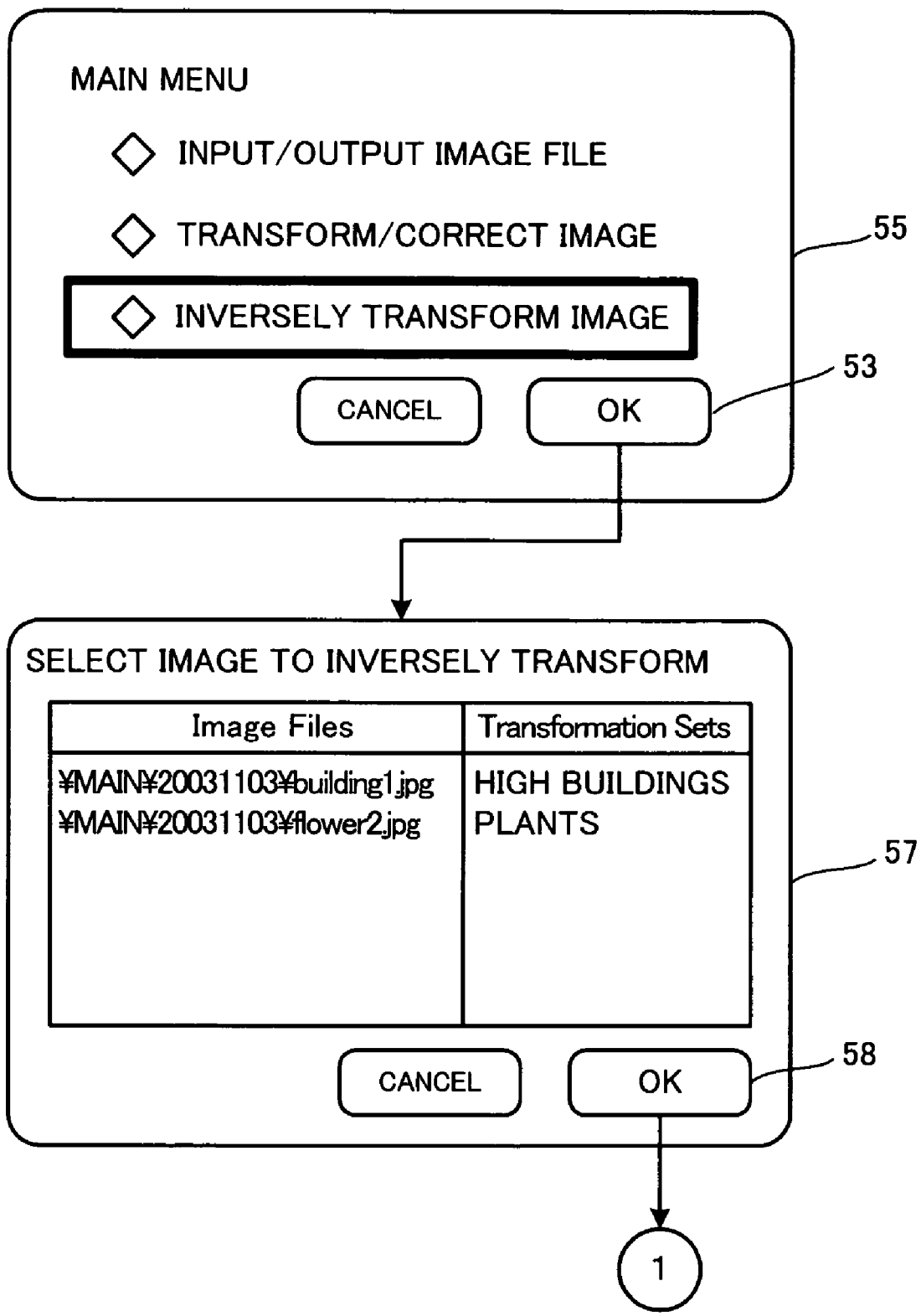
FIG. 16 is a flowchart according to an example of the invention.

Next, an inverse transformation of an output image will be described. When, on the main menu screen 55 shown in FIG. 16, "INVERSELY TRANSFORM IMAGE" is selected and the "OK" button 53 is then clicked, a transformation set selecting screen 57 is displayed. The transformation set selecting screen 57 displays a list of image files associated with a transformation set table stored in the first storage portion 52. When a user selects an image file and clicks an "OK" button 58, the inverter portion 24 loads the transformation set table associated with the selected image file, reverses the order of rows of the transformation set table, performs an inverse transformation on the output image representing the selected image file by processing in accordance with the flow shown in FIG. 14 with reference to the transformation set table 48 in which the order of rows has been changed, and creates the original input image.

As described above, according to the examples of the invention, deterioration of an output image due to geometric transformations can be kept to a minimum by finally collectively performing interpolation processing for geometric transformations in order to perform interpolating processing once for image transformations involved in multiple geometric transformations.

What is claimed is:

1. A computer-implemented image processing method, comprising:
    a step of obtaining an input image; and
    a step of obtaining a transformation order of a set of multiple image transformations including at least two geometric transformations and a light amount correction, in accordance with a user's manipulation; and
    a transformation step of performing the set of multiple image transformations, the transformation step including
        targeting one of the multiple image transformations from first to last of the transformation order,
        performing a coordinate transformation corresponding to the geometric transformation targeted, if one of the geometric transformations is targeted,
        performing interpolation of space pixels due to the coordinate transformation after the coordinate transformation is performed, if the geometric transformation of the last of the transformation order is targeted,
        avoiding interpolation of the space pixels after the coordinate transformation is performed, if the geometric transformation other than the last of the transformation order is targeted, and
        performing interpolation of the space pixels before performing correction of pixel values, if the light amount correction is targeted, the light amount correction not being limited to the last of the transformation order,
    wherein each step of the image processing method is executed by a processor.

2. An image processing method according to claim 1, further comprising a command receiving step of receiving multiple transformation commands in an arbitrary order,
    wherein, in the transformation step, multiple image transformations are performed in a predetermined order, which is different from an order of the multiple transformation commands received in the command receiving step.

3. An image processing method according to claim 2, wherein, in the transformation step, pixel values of pixels corresponding to a peripheral part of a lens used for forming an image of a subject of the input image are corrected before geometric transformations.

4. An image processing method according to claim 2, wherein, in the transformation step, a correction of a distortion due to a distortion aberration of a lens used for forming an image of a subject of the input image, a perspective transformation, and a linear geometric transformation are performed in order.

5. An image processing method according to claim 1, further comprising:
a first storing step of storing transformation parameters, which are used in the multiple image transformations performed in the transformation step, in association with the output image; and
an inverse transformation step of inversely transforming the output image based on the transformation parameters stored in the first storing step.

6. An image processing method according to claim 5, wherein, in the first storing step, an order of the multiple image transformations performed in the transformation step is stored in association with the output image, and
in the inverse transformation step, multiple inverse transformations corresponding to multiple image transformations performed in the transformation step are performed based on the transformation order stored in the first storing step.

7. An image processing method according to claim 1, further comprising a selecting step of receiving a select command for selecting one of multiple predetermined combinations of multiple image transformations,
wherein, in the transformation step, a combination of multiple transformations in accordance with the received select command is performed.

8. An image processing method according to claim 7, further comprising a defining step of storing a combination of multiple image transformations in a storage medium,
wherein, in the selecting step, the select command for selecting one of combinations stored in the storage medium is received.

9. An image processor, comprising:
a unit for obtaining an input image;
a unit for obtaining a transformation order of a set of multiple image transformations including at least two geometric transformations and a light amount correction, in accordance with a user's manipulation; and
a transformation unit for performing the set of multiple image transformations, the transformation unit
targeting one of the multiple image transformations from first to last of the transformation order,
performing a coordinate transformation corresponding to the geometric transformation targeted, if one of the geometric transformations is targeted,
performing interpolation of space pixels due to the coordinate transformation after the coordinate transformation is performed, if the geometric transformation of the last of the transformation order is targeted,
avoiding interpolation of the space pixels after the coordinate transformation is performed, if the geometric transformation other than the last of the transformation order is targeted, and
performing interpolation of the space pixels before performing correction of pixel values, if the light amount correction is targeted, the light amount correction not being limited to the last of the transformation order.

10. A computer-readable storage medium having a computer program stored thereon, the computer program including program instructions for causing a computer to implement image processing functions, the program instructions comprising:
program instructions for obtaining an input image;
program instructions for obtaining a transformation order of a set of multiple image transformations including at least two geometric transformations and a light amount correction, in accordance with a user's manipulation; and
program instructions for performing the set of multiple image transformations, the program instructions for performing the set of multiple image transformations causing the computer to implement the functions of
targeting one of the multiple image transformations from first to last of the transformation order,
performing a coordinate transformation corresponding to the geometric transformation targeted, if one of the geometric transformations is targeted,
performing interpolation of space pixels due to the coordinate transformation after the coordinate transformation is performed, if the geometric transformation of the last of the transformation order is targeted,
avoiding interpolation of the space pixels after the coordinate transformation is performed, if the geometric transformation other than the last of the transformation order is targeted, and
performing interpolation of the space pixels before performing correction of pixel values, if the light amount correction is targeted, the light amount correction not being limited to the last of the transformation order.

* * * * *